June 27, 1961 C. E. BRADY 2,989,972
ACCUMULATOR CHARGING MECHANISM
Filed May 18, 1959
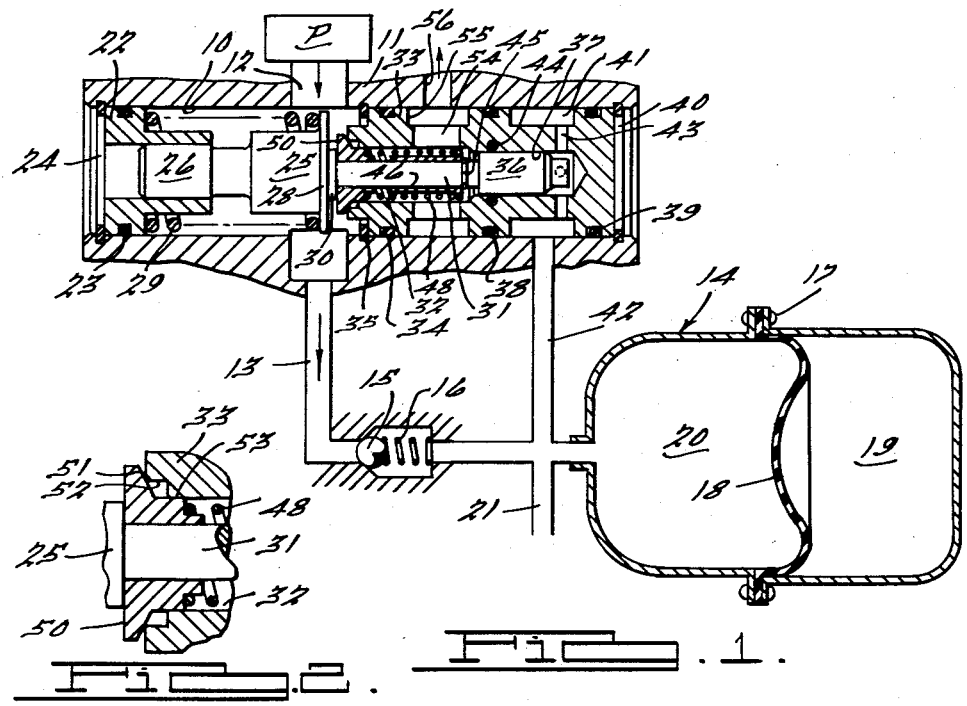
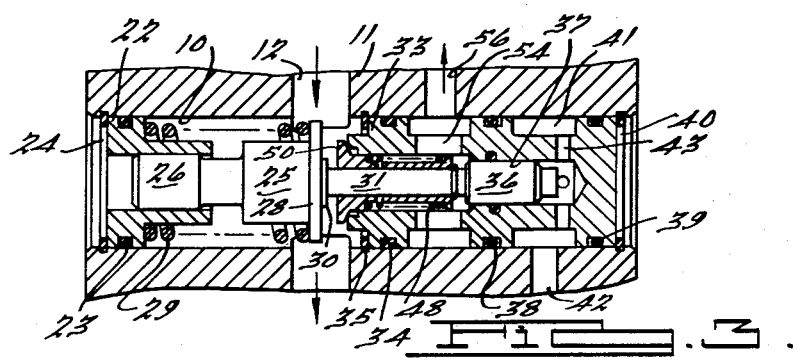
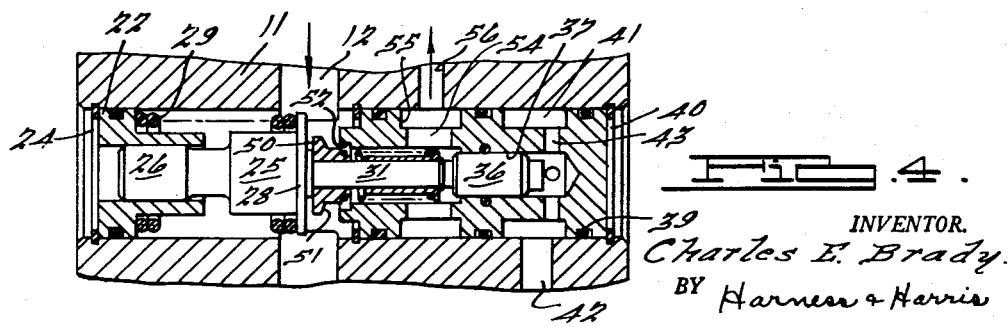
INVENTOR.
Charles E. Brady.
BY Harness & Harris
ATTORNEYS.

United States Patent Office 2,989,972
Patented June 27, 1961

2,989,972
ACCUMULATOR CHARGING MECHANISM
Charles E. Brady, Oak Park, Mich., assignor to Chrysler Corporation, Highland Park, Mich., a corporation of Delaware
Filed May 18, 1959, Ser. No. 813,970
11 Claims. (Cl. 137—108)

This invention relates to a hydraulic pressure supply mechanism particularly suited for use with an automobile central hydraulic system wherein a high pressure hydraulic pump and a hydraulic pressure accumulator cooperate to supply fluid pressure to an assortment of hydraulic power accessories, such as power steering, power brakes, window regulators, seat adjustment means and the like.

An important object of the present invention is to provide an improved highly efficient and particularly simple charging mechanism of economical construction for controlling the supply of pressurized fluid to a fluid pressure accumulator and for maintaining the accumulator pressure within predetermined upper and lower limits.

Another object is to provide such a mechanism including an accumulator charging valve means having a poppet type shiftable valve element selectively operable to connect the source of pressurized fluid with the accumulator to charge the latter when the accumulator pressure drops below the lower limit and thereafter until the accumulator pressure attains its upper limit, and to provide a bypass circuit between the source and an exhaust port to prevent charging of the accumulator when its pressure attains said upper limit and thereafter until the accumulator pressure again falls to the lower limit.

Another object is to provide an improved accumulator charging mechanism particularly adapted for use in the central hydraulic system of an automobile wherein a fluid pressure actuated motor is connected with the accumulator pressure for actuation thereby and is also connected with a shiftable rod extending into a valve chamber through an exhaust port which opens into the chamber. The motor is operable by the accumulator pressure to move the rod in the direction through said port into said chamber. Opposite to the exhaust port, an enlarged spool portion of the rod extends slidably through the chamber wall in fluid sealing engagement therewith to provide a resultant effective area of the rod exposed to the pressure in the chamber urging the rod in said direction. A primary spring acting on the rod urges the latter in the opposite direction. The lightweight poppet-type valve element freely slidable on the rod in fluid sealing engagement therewith has an enlarged portion within the chamber adapted to seat against the high pressure side of the exhaust port to close the latter and is held in the port closing position by the pressure differential between the chamber side and exhaust side of the port. The poppet element also has a portion at the exhaust side of the port adapted to be exposed to the pressure in the chamber when the poppet element is unseated slightly from the port, thereby to decrease the effective area of the poppet element exposed to the aforesaid pressure differential urging the poppet element to the port closing position. A secondary spring disposed between the rod and poppet element urges the latter from its seated position with increasing force upon movement of the rod in the first-named direction. An abutment or stop shiftable with the rod is arranged to engage the poppet element and shift the latter from its seated port closing position when the accumulator pressure attains a predetermined upper limiting value. The chamber is also connected with the source of fluid pressure which charges the accumulator, so that when the latter is being charged, the pressure in the chamber and in the accumulator are the same.

By virtue of the foregoing structure, while the accumulator is being charged at pressures below the aforesaid upper limiting value, the accumulator pressure acting on the motor in cooperation with the pressure in the valve chamber gradually moves the rod in the first-named direction, which movement is opposed by the primary spring. During this movement the rod slides freely with respect to the poppet valve element and the latter remains seated at the exhaust port to close the latter. When the accumulator pressure attains the predetermined upper limit, the stop or abutment on the rod engages the poppet element to unseat the latter slightly from the exhaust port, thereby to expose the aforesaid portion of the poppet element at the exhaust side of the port to the chamber pressure. In consequence the poppet, aided by the secondary spring, is snapped positively to a port opening position to establish communication between thhe exhaust port and the chamber. The pressure source is thus bypassed to exhaust to prevent additional charging of the accumulator. A check valve between the accumulator and the chamber prevents loss of accumulator pressure to exhaust when the accumulator is not being charged. The use of the lightweight poppet valve element freely slidable on the rod avoids the customary effects of friction and inertia on the critical operating elements of the mechanism and assures positive valve action at the desired pressure limits.

When the accumulator pressure begins to drop, the motor actuating pressure also drops, enabling the primary spring to shift the rod in said opposite direction. During this movement a second abutment or stop on the rod engaged with the poppet element moves the latter to a position adjacent the opening of the exhaust port. The Bernulli effect resulting from the increased velocity of fluid flow through the exhaust port as the latter becomes partially closed causes a pressure-drop across the poppet which in turn causes the poppet to snap positively to its closed position, closing the chamber to exhaust to enable charging of the accumulator.

Other objects of this invention will appear in the following description and appended claims, reference being had to the accompanying drawings forming a part of this specification wherein like reference characters designate corresponding parts in the several views.

FIGURE 1 is a fragmentary schematic mid-sectional view through a mechanism embodying the present invention, showing the poppet valve in the accumulator charging position.

FIGURE 2 is an enlarged fragmentary view similar to FIGURE 1, showing a portion of the poppet valve seated at the exhaust port.

FIGURE 3 is a view similar to FIGURE 1, showing the motor actuated rod shifted to the left immediately prior to opening of the poppet valve.

FIGURE 4 is a view similar to FIGURE 1, showing the poppet valve at the open position.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring to the drawings, a suitable source of fluid pressure is indicated at P and may comprise as in the present instance the pressure resulting from a high pressure automobile engine driven hydraulic pump. A cylindrical chamber 10 within a valve housing 11 is in communication with the source P via an inlet duct 12. Discharging from the chamber 10 is a conduit 13 which communicates with an accumulator 14 through a one-way check valve illustrated by way of example as a ball 15 and spring 16 of well known construction. The accumulator 14 may be conventional and comprises in the present instance two dished pressure sustaining shells secured together by rivets 17. A diaphragm 18 partitions the accumulator into a gas-filled chamber 19 and a fluid or working chamber 20 and also serves as a fluid sealing gasket between the two accumulator shell parts. As fluid pressure is supplied via duct 13 to the accumulator, the working chamber 20 increases in volume and pressure, whereas the gas-filled chamber 19 decreases in volume as the gas therein is compressed. A working conduit 21 communicates with the accumulator at a location upstream of the check valve 15, 16 so as to supply pressurized fluid to various fluid actuated accessories, such as power brakes, window regulators and the like.

The left end of chamber 10 is sealed by a tubular closure 22 having an annular seal 23 therearound and retained against leftward movement by a snap ring 24 partially embedded into the housing 11 exteriorly of the closure 22. A fluid actuated rod 25 has an enlarged integral cylindrical spool portion 26 closely fitting in coaxial sliding fluid sealing engagement within the bore of closure 22 to complete the closure at the left end of chamber 10. Spaced to the right from the spool portion 26 is an enlarged shoulder 28 integral with the rod 25, which serves as a retainer for a primary coil spring 29 under compression between shoulder 28 and an annular portion of closure 22. Immediately to the right of shoulder 28 is a reduced spaced abutment 30 from which extends a reduced portion 31 of rod 25 coaxially and freely through an exhaust conduit 32 comprising the bore of an annular closure 33. An annular fluid seal 34 extends around closure 33 adjacent its left end and the latter is retained against leftward movement by a C-ring 35 partially embedded into the housing 11. At the extreme right of reduced rod portion 31 is an integral fluid actuated plunger 36 shiftable within a coaxial cylindrical bore portion 37 of the closure 33. Axially spaced seals 38 and 39 extend around closure 33 adjacent the right end thereof to provide annular fluid seals between the latter and the juxtaposed portions of housing 11. As indicated in the drawings, the right end of closure 33 is closed and the latter is prevented from rightward movement by a C-ring partially embedded in housing 11.

An annular port 41 is located in the outer circumference of closure 33 between the seals 38 and 39 and communicates with the accumulator working chamber 20 via conduit 42. A plurality of radial ducts 43 connect port 41 with the bore 37, thereby to direct the accumulator pressure to the right of plunger 36, whereby the latter comprises a fluid actuated motor urging the integral rod 25 to the left. In order to prevent leakage of fluid from the bore 37, an annular fluid seal 44 is provided therein around the circumference of plunger 36.

A retaining C-ring 45 around the reduced rod portion 31 adjacent plunger 36 provides a locating stop for a spring retaining sleeve 46. The latter is provided with an annular flange at its right end which provides a seat for a secondary coil spring 48 around sleeve 46 and engaged at its left end with an annular inner shoulder of a poppet valve 50.

Referring to FIGURE 2, poppet valve 50 has an enlarged annular tapered seat portion 51 adapted to seat at the mouth of the exhaust conduit 32 and to provide an annular fluid seal thereat closing the same to chamber 10. The mouth of conduit 32 is enlarged at an annular step 52 extending to the right of the tapered seat 51. A cylindrical portion 53 of the poppet valve extends to the right of step 52 at a slight overlap closely fitting within the exhaust conduit 32 to minimize fluid leakage into the latter around portion 53 when the poppet element 50 is slightly unseated, FIGURE 3, as explained below. Also opening radially into exhaust conduit 32 are a plurality of ducts 54 in communication with an annular recess 50 in the closure 33, which in turn communicates with an exhaust or drain conduit 56.

Operation of the device is explained in conjunction with FIGURES 1, 3, and 4. In FIGURE 1, the poppet valve 50 and rod 25 are shown in the accumulator discharged position, whereat the accumulator pressure is less than a predetermined minimum limiting value. As fluid is supplied to chamber 10 from pressure source P and thence via conduit 13 to the accumulator chamber 20, the latter begins to charge. In this condition, chamber 10 is closed to the exhaust conduit 32 by the poppet seat 51 forced against the mouth of exhaust conduit 32 by pressure P. As the accumulator pressure increases, the pressure on plunger 36 urging the latter to the left and likewise the pressure in chamber 10 increases. As a result the sum of the force on plunger 36 and the fluid pressure force in chamber 10 on rod 25 resulting from the differences in cross sectional area between spool 26 and reduced rod portion 31 urges rod 25 to the left against the tension of primary spring 29. During this movement the poppet 50 is held at the port closing position of FIGURE 1 by the pressure in chamber 10, as illustrated in FIGURE 3. Finally when leftward movement of rod 25 shifts the spring retainer 46 for secondary spring 48 leftward into engagement with poppet valve 50, a slight additional increase in accumulator pressure moving sleeve 46 leftward causes poppet valve 50 to be slightly unseated from the mouth of the exhaust conduit 32. Immediately, by virtue of the step enlargement 52 and the close fit between poppet portion 53 and the exhaust duct 32, the pressure of chamber 10 is applied to the tapered poppet valve seat portion 51 which was formerly at the drain or exhaust side of the poppet valve 50. In consequence the latter assisted by the secondary spring will snap leftward from its seat to the position shown in FIGURE 4, thereby connecting chamber 10 to the drain or exhaust conduit 56 via conduits 32, 54, and 55. The accumulator 14 is thus bypassed and further charging is prevented. Check valve 15, 16 prevents loss of accumulator pressure to the drain 56.

When the accumulator pressure beings to drop in consequence of usage of fluid in its working chamber 20, the pressure acting on plunger 36 moving rod 25 leftward reduces, and primary spring 29 gradually moves plunger 36 to the right. The rod abutment portion 30 engages the left face of poppet valve 50 bringing the poppet into proximity with the enlarged mouth of exhaust conduit 32. At this position of the poppet 50, the rapid flow of fluid from chamber 10 into exhaust conduit 32 results in a pressure drop across the poppet, whereby the latter is positively forced to its seated position to close the communication between chamber 10 and exhaust conduit 32. The accumulator then begins to charge again enabling repetition of the cycle.

In accordance with the foregoing structure, the poppet 50 is either in its open or closed position. Floating of the valve mechanism adjacent a partially open or partially closed position is completely avoided. The upper and low limiting pressure values are predetermined by the spring loads and spring rates of springs 29 and 48, the cross sectional area of plunger 36 and the effective area differential in chamber 10 acting on rod 25 urging the latter leftward, so that considerable versatility of operation and adjustment of the limiting pressure is radially accomplished.

I claim:
1. In a mechanism for charging a fluid pressure accumulator conduit means having inlet and outlet means and also having a drain port therein, a shiftable rod extending through said port, a poppet valve element slidable on said rod and having an enlarged end within said conduit means adapted to seat therein at said drain port to effect a seal thereat to close the latter, said poppet valve element also having a portion at the drain side of said seal adapted to be exposed to the pressure within said conduit means when said poppet valve element is unseated from said port, yieldable means yieldingly resisting movement of said rod in the direction through said port into said conduit means, means adapted to be connected with said accumulator for applying pressure to said rod proportional to the pressure in said accumulator to urge said rod in said direction, and means interconnecting said rod and poppet valve element to move the latter from its seated position at said port upon predetermined movement of said rod in said direction.

2. In a mechanism for charging a fluid pressure accumulator conduit means having inlet and outlet means and also having a drain port therein, a rod extending through said port, a poppet valve element slidable on said rod and having an enlarged end within said conduit means adapted to seat therein at said drain port to effect a seal thereat to close the latter, said poppet valve element also having a portion at the drain side of said seal adapted to be exposed to the pressure within said conduit means when said poppet valve element is unseated from said port, resilient means yieldingly resisting movement of said rod in the direction through said port into said conduit means, means adapted to be connected with said accumulator for applying pressure to said rod proportional to the pressure in said accumulator to urge said rod in said direction, and means including a resilient element disposed between portions fixed on said rod and poppet valve element for urging the latter from its seated position at said port upon the application of predetermined pressure on said rod urging the latter in said direction.

3. In a mechanism for charging a fluid pressure accumulator conduit means having inlet and outlet means and also having a drain port therein, a rod extending through said port, a poppet valve element slidable on said rod and having an enlarged end within said conduit means adapted to seat therein at said drain port to effect a seal thereat to close the latter, said poppet valve element also having a portion at the drain side of said seal adapted to be exposed to the pressure within said conduit means when said poppet valve element is unseated from said port, resilient means yieldingly resisting movement of said rod in the direction through said port into said conduit means, means adapted to be connected with said accumulator for applying pressure to said rod proportional to the pressure in said accumulator to urge said rod in said direction, means on said rod for abutting said poppet valve element for moving the latter from its seated position at said port upon predetermined movement of said rod in said direction, and spring means interconnecting said rod and poppet valve element to urge the latter in said direction with increasing force upon movement of said rod in said direction.

4. In a mechanism for charging a fluid pressure accumulator conduit means having inlet and outlet means and also having a drain port therein, a rod extending through said port, a poppet valve element slidable on said rod and having an enlarged end within said conduit means adapted to seat therein at said drain port to effect a seal thereat to close the latter, said poppet valve element also having a portion at the drain side of said seal adapted to be exposed to the pressure within said conduit means when said poppet valve element is unseated from said port, resilient means yieldingly resisting movement of said rod in the direction through said port into said conduit means, means adapted to be connected with said accumulator for applying pressure to said rod proportional to the pressure in said accumulator to urge said rod in said direction, means including a resilient element disposed between portions fixed on said rod and poppet valve element for urging the latter from its seated position at said port upon the application of predetermined pressure on said rod urging the latter in said direction, and a one way check valve associated with said outlet to prevent reverse flow of pressurized fluid therethrough.

5. In a mechanism for charging a fluid pressure accumulator conduit means having inlet and outlet means and also having a drain port therein, a rod extending through said port, a poppet valve element slidable on said rod and having an enlarged end within said conduit means adapted to seat therein at said drain port to effect a seal thereat to close the latter, said poppet valve element also having a portion at the drain side of said seal adapted to be exposed to the pressure within said conduit means when said poppet valve element is unseated from said port, resilient means yieldingly resisting movement of said rod in the direction through said port into said conduit means, means adapted to be connected with said accumulator for applying pressure to said rod proportional to the pressure in said accumulator to urge said rod in said direction, means on said rod for abutting said poppet valve element for moving the latter from its seated position at said port upon predetermined movement of said rod in said direction, spring means interconnecting said rod and poppet valve element to urge the latter in said direction with increasing force upon movement of said rod in said direction, and a one way check valve associated with said outlet to prevent reverse flow of pressurized fluid therethrough.

6. In a mechanism for charging a fluid pressure accumulator, a housing having a primary chamber therein, a drain port opening into said chamber, said chamber also having an inlet and an outlet, a rod extending through said port into said chamber, a poppet valve element slidable on said rod and having an enlarged end within said chamber adapted to seat therein at said drain port to effect a seal thereat to close the latter, said poppet valve element also having a portion at the drain side of said seal adapted to be exposed to the pressure within said chamber when said poppet valve element is unseated from said port, spring means yieldingly resisting movement of said rod in the direction through said port into said chamber, means adapted to be connected with said accumulator for applying pressure to said rod proportional to the pressure in said accumulator to urge said rod in said direction, and means including a resilient element disposed between portions fixed on said rod and poppet valve element for urging the latter from its seated position at said port upon the application of predetermined pressure on said rod urging the latter in said direction.

7. In a mechanism for charging a fluid pressure accumulator, a housing having a primary chamber therein, a drain port opening into said chamber, said chamber also having an inlet and an outlet, a rod extending through said port into said chamber, a poppet valve element slidable on said rod and having an enlarged end within said chamber adapted to seat therein at said drain port to effect a seal thereat to close the latter, said poppet valve element also having a portion at the drain side of said seal adapted to be exposed to the pressure within said chamber when said poppet valve element is unseated from said port, spring means yieldingly resisting movement of said rod in the direction through said port into said chamber, means adapted to be connected with said accumulator for applying pressure to said rod proportional to the pressure in said accumulator to urge said rod in said direction, means on said rod for abutting said poppet valve element for moving the latter from its seated position at said port upon predetermined movement of said rod in said direction, spring means interconnecting said rod and poppet valve element to urge the latter in said direction with increasing force upon movement of said rod in said direction, and a one way check valve associated with said outlet to prevent reverse flow of pressurized fluid therethrough.

8. In a mechanism for charging a fluid pressure accumulator, a housing having a primary chamber therein, a drain port opening into said chamber, said chamber also having an inlet and an outlet, a rod extending through said port into said chamber, a poppet valve element slidable on said rod and having an enlarged end within said chamber adapted to seat therein at said drain port to effect a seal thereat to close the latter, said rod having an end of large cross sectional area extending from said chamber in fluid sealing engagement with said housing and having a portion of smaller cross sectional area extending slidably through said poppet valve element in fluid sealing engagement therewith, said poppet valve element also having a portion at the drain side of said seal adapted to be exposed to the pressure within said chamber when said poppet valve element is unseated from said port, spring means yieldingly resisting movement of said rod in the direction through said port into said chamber, means adapted to be connected with said accumulator for applying pressure to said rod proportional to the pressure in said accumulator to urge said rod in said direction, and means including a resilient element disposed between portions fixed on said rod and poppet valve element for urging the latter from its seated position at said port upon the application of predetermined pressure on said rod urging the latter in said direction.

9. In a mechanism for charging a fluid pressure accumulator, a housing having a primary chamber therein, a drain port opening into said chamber, said chamber also having an inlet and an outlet, a rod extending through said port into said chamber, a poppet valve element slidable on said rod and having an enlarged end within said chamber adapted to seat therein at said drain port to effect a seal thereat to close the latter, said rod having an end of large cross sectional area extending from said chamber in fluid sealing engagement with said housing and having a portion of smaller cross sectional area extending slidably through said poppet valve element in fluid sealing engagement therewith, said poppet valve element also having a portion at the drain side of said seal adapted to be exposed to the pressure within said chamber when said poppet valve element is unseated from said port, spring means yieldingly resisting movement of said rod in the direction through said port into said chamber, means adapted to be connected with said accumulator for applying pressure to said rod proportional to the pressure in said accumulator to urge said rod in said direction, means on said rod for abutting said poppet valve element for moving the latter from its seated position at said port upon predetermined movement of said rod in said direction, and spring means interconnecting said rod and poppet valve element to urge the latter in said direction with increasing force upon movement of said rod in said direction.

10. In a mechanism for charging a fluid pressure accumulator, a housing having a primary chamber therein, a drain port opening into said chamber, said chamber also having an inlet and an outlet, a rod extending through said port into said chamber, a poppet valve element slidable on said rod and having an enlarged end within said chamber adapted to seat therein at said drain port to effect a seal thereat to close the latter, said rod having an end of large cross sectional area extending from said chamber in fluid sealing engagement with said housing and having a portion of smaller cross sectional area extending slidably through said poppet valve element in fluid sealing engagement therewith, said poppet valve element also having a portion at the drain side of said seal adapted to be exposed to the pressure within said chamber when said poppet valve element is unseated from said port, spring means yieldingly resisting movement of said rod in the direction through said port into said chamber, means adapted to be connected with said accumulator for applying pressure to said rod proportional to the pressure in said accumulator to urge said rod in said direction, and means including a resilient element disposed between portions fixed on said rod and poppet valve element for urging the latter from its seated position at said port upon the application of predetermined pressure on said rod urging the latter in said direction, and a one way check valve associated with said outlet to prevent reverse flow of pressurized fluid therethrough.

11. In a mechanism for charging a fluid pressure accumulator, a housing having a primary chamber therein, a drain port opening into said chamber, said chamber also having an inlet and an outlet, a rod extending through said port into said chamber, a poppet valve element slidable on said rod and having an enlarged end within said chamber adapted to seat therein at said drain port to effect a seal thereat to close the latter, said rod having an end of large cross sectional area extending from said chamber in fluid sealing engagement with said housing and having a portion of smaller cross sectional area extending slidably through said poppet valve element in fluid sealing engagement therewith, said poppet valve element also having a portion at the drain side of said seal adapted to be exposed to the pressure within said chamber when said poppet valve element is unseated from said port, spring means yieldingly resisting movement of said rod in the direction through said port into said chamber, means adapted to be connected with said accumulator for applying pressure to said rod proportional to the pressure in said accumulator to urge said rod in said direction, means on said rod for abutting said poppet valve element for moving the latter from its seated position at said port upon predetermined movement of said rod in said direction, spring means interconnecting said rod and poppet valve element to urge the latter in said direction with increasing force upon movement of said rod in said direction, and a one way check valve associated with said outlet to prevent reverse flow of pressurized fluid therethrough.

References Cited in the file of this patent

UNITED STATES PATENTS 2,327,830    Stevenson et al.  --------  Aug. 24, 1943